2 Sheets--Sheet 1.
W. CADE.
Agricultural-Boilers.
No. 149,437. Patented April 7, 1874.
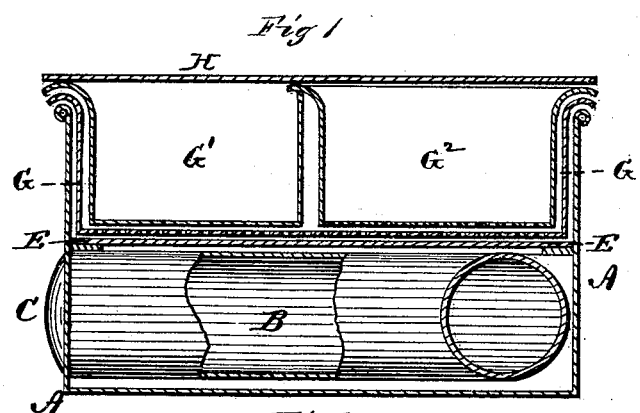
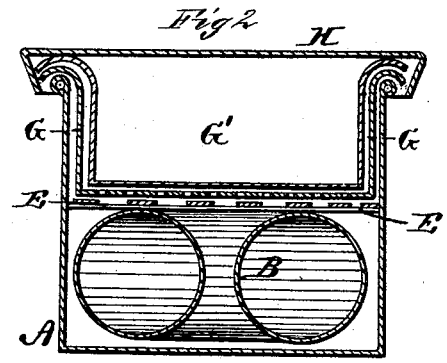
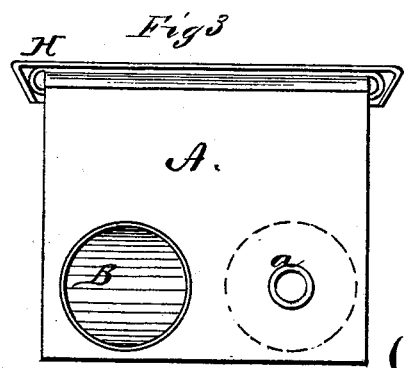
WITNESSES.
INVENTOR
By
Attorneys.

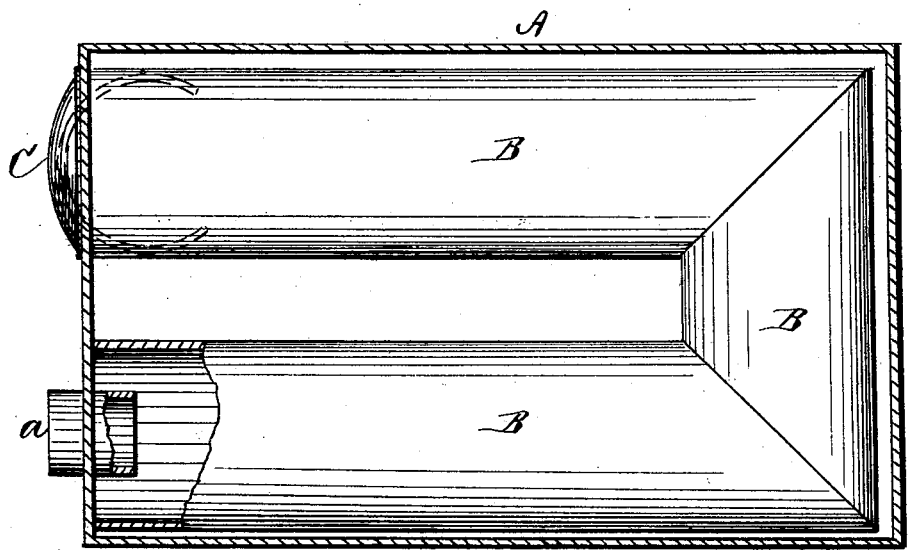

UNITED STATES PATENT OFFICE.

WILLIAM CADE, OF GRINNELL, IOWA, ASSIGNOR TO HIMSELF AND HERRICK & CO., OF SAME PLACE.

IMPROVEMENT IN AGRICULTURAL BOILERS.

Specification forming part of Letters Patent No. 149,437, dated April 7, 1874; application filed February 13, 1874.

*To all whom it may concern:*

Be it known that I, WILLIAM CADE, of Grinnell, in the county of Poweshiek and in the State of Iowa, have invented certain new and useful Improvements in Farmers' Boilers and Steamers; and do hereby declare that the following is a full, clear, and exact description thereof, reference being had to the accompanying drawings and to the letters of reference marked thereon, making a part of this specification.

The nature of my invention consists in the construction and arrangement of an agricultural boiler and steamer, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my boiler and steamer. Fig. 2 is a transverse vertical section of the same, and Fig. 3 a front elevation thereof with the door removed. Fig. 4 is an enlarged horizontal section of the machine.

A represents a box, of any suitable form and dimensions, forming my boiler. Within this box or boiler, near the bottom, is placed a sheet-iron cylinder, B, provided with a cap or door, C, at the front end of the box, and passing from the front longitudinally to the back end of the box, and thence returning to the front by right-angled corners, and provided, at the front end of the box, with a smoke-pipe, *a*. This cylinder forms the fire-box or fire-chamber in which the fire is made for heating the water contained in the boiler A. On the top of the fire box or cylinder B is laid a grating, E, or open platform, for the purpose of steaming or boiling large vegetables or feed, such as corn in the ear, &c., the lower part of the box around the fire-chamber being filled with water. The same platform may be used for scalding hogs. Over the platform E is a box, G, with perforated bottom, filling the upper part of the boiler A, and either resting upon the platform or suspended from the sides of the boiler, as shown in the drawing. This box is to steam small feed, such as shelled corn, &c., the perforations in the bottom allowing the steam to rise to the feed, while the feed will not fall through.

In lieu of the box or pan G, or in combination therewith, may be used two other boxes or pans, $G^1$ and $G^2$, of one-half the size. The pan $G^1$ has a solid bottom, while the bottom of the pan $G^2$ is perforated. A complete set of pans is thus introduced for cooking ground feed or whole feed, and for cooking vegetables of all kinds. The whole is covered by a lid, H, which may slide over the top of the boiler, and be fastened with clamps or other suitable fastenings to prevent escape of steam, if desired.

This machine may be used for washing clothes, general laundry-work, and for all cooking purposes for farm, house, or restaurant, where steaming is desired.

Having thus fully described my invention, what I claim as new, and desire to secure by Letters Patent, is—

1. The combination, with the casing A, with right-angular cylindrical fire-chamber B, having cap or door C and smoke-pipe *a*, of the grating E and the removable pan G, provided with perforated bottom, all substantially as and for the purposes herein set forth.

2. The removable pans $G^1$ $G^2$ and protecting-cap H, in combination with the pan G, with perforated bottom, grating E, and the right-angular cylindrical fire-chamber B, and the casing A, all substantially as and for the purposes herein set forth.

In testimony that I claim the foregoing, I have hereunto set my hand this 19th day of January, 1874.

WM. CADE.

Witnesses:
MATT. PHELPS,
ENOCH JAY.